United States Patent [19]

Kress et al.

[11] Patent Number: 4,786,671

[45] Date of Patent: Nov. 22, 1988

[54] FLAMEPROOFING AGENT COMBINATIONS AND THEIR USE IN THERMOPLASTIC MOULDING COMPOSITIONS OF POLYCARBONATES AND ABS POLYMERS

[75] Inventors: Hans-Jürgen Kress, Krefeld; Friedemann Müller, Neuss; Horst Peters, Leverkusen; Christian Lindner, Cologne; Josef Beukers, Krefeld, all of Fed. Rep. of Germany

[73] Assignee: Bayer Aktiengesellschaft, Leverkusen, Fed. Rep. of Germany

[21] Appl. No.: 821,822

[22] Filed: Jan. 23, 1986

Related U.S. Application Data

[63] Continuation-in-part of Ser. No. 671,220, Nov. 14, 1984, abandoned.

[30] Foreign Application Priority Data

Nov. 24, 1983 [DE] Fed. Rep. of Germany ....... 3342414

[51] Int. Cl.⁴ ................................................ C08K 5/34

[52] U.S. Cl. ..................................... 524/94; 524/508; 524/520; 524/546

[58] Field of Search ........................................... 524/94

[56] References Cited

U.S. PATENT DOCUMENTS

| | | | |
|---|---|---|---|
| 3,873,567 | 3/1975 | Cyba | 524/94 |
| 4,208,489 | 6/1980 | Schmidt et al. | 524/94 |
| 4,366,276 | 12/1982 | Freitag et al. | 524/94 |
| 4,374,220 | 2/1983 | Sonnenberg | 524/94 |

FOREIGN PATENT DOCUMENTS

| | | |
|---|---|---|
| 2703710 | 8/1978 | Fed. Rep. of Germany . |
| 2937877 | 4/1980 | Fed. Rep. of Germany . |
| 2281403 | 3/1976 | France . |

*Primary Examiner*—Lewis T. Jacobs
*Attorney, Agent, or Firm*—Connolly and Hutz

[57] ABSTRACT

The present invention relates to new flameproofing agent combinations of bisphthalimides and tetrafluoroethylene polymers and their use for providing thermoplastic moulding compositions of halogenated polycarbonates and ABS polymers with a flame-repellent finish.

35 Claims, No Drawings

FLAMEPROOFING AGENT COMBINATIONS AND THEIR USE IN THERMOPLASTIC MOULDING COMPOSITIONS OF POLYCARBONATES AND ABS POLYMERS

The present invention relates to new flameproofing agent combinations consisting of
(a) 0.5 to 2.5 parts by weight of a bisphthalimide of the formula (I)

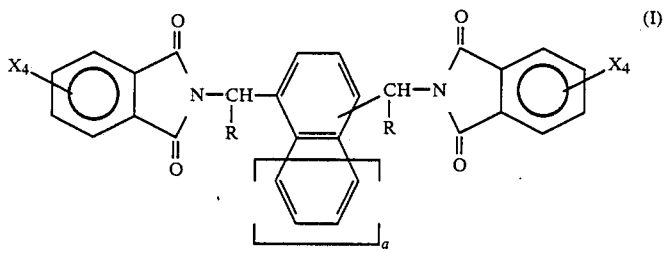

wherein
X denotes H or halogen, such as, for example, chlorine or bromine,
a denotes zero or 1 and
R denotes a hydrogen $C_1$-$C_4$-alkyl, a $C_5$-$C_6$-cycloalkyl or an optionally substituted $C_6$-$C_{30}$-aryl,
and
(b) 0.05 to 1 part by weight of a tetrafluoroethylene polymer.

Examples of alkyl radicals are methyl, ethyl, n-propyl, iso-propyl, n-butyl and iso-butyl; examples of cycloalkyl radicals are cyclopentyl and cyclohexyl; examples of aryl radicals are phenyl and naphthyl; examples of substituted aryl radicals are alkyl-substituted aryl radicals, such as methylphenyl, dimethylphenyl, ethylphenyl or propylphenyl radicals.

The bisphthalimides which can be used according to the invention are known from the literature; see, for example: Strassman, Chem. Ber. 21, page 579, Brömme, Chem. Ber. 21, page 2704, Lustig, Chem. Ber. 28, page 2987 and Kaufler, Chem. Ber. 40, page 3266, and can be prepared according to the specifications mentioned therein.

The tetrafluoroethylene polymers which are suitable according to the invention are polymers with fluorine contents of 65 to 75% by weight, preferably 70 to 76% by weight. Examples are polytetrafluoroethylene, tetrafluoroethylene/hexafluoropropylene copolymers or tetrafluoroethylene copolymers containing small amounts of fluorine-free copolymyerizable ethylenically unsaturated monomers. The polymers are known. They can be used in finely divided form, usually as powders. They can be prepared by known processes, thus, for example, by polymerization of tetrafluoroethylene in an aqueous medium using a catalyst which forms free radicals, such as sodium peroxydisulphate, potassium peroxydisulphate or ammonium peroxydisulphate, under pressures of 7 to 71 kg/cm² and at temperatures of 0° to 200° C., preferably at temperatures of 20° to 100° C. (For further details, see, for example, U.S. Pat. No. 2,393,967).

The polytetrafluoroethylenes which are suitable according to the invention should preferably have weight-average molecular weights $\overline{M}w$ of between $10^5$ and $10^6$.

The new flameproofing agent combinations are suitable for providing mixtures of halogenated aromatic, thermoplastic polycarbonates and ABS polymers with a flame-repellent finish, VO according to UL-Subj. 94 being achieved at a thickness of 3.2 mm of the test bars.

The present invention thus also relates to the use of the new flameproofing agent combination of phthalimides of the formula (I) and tetrafluoroethylene polymers for providing mixtures of halogenated, preferably brominated, aromatic, thermoplastic polycarbonates and ABS polymers with a flame-repellent finish.

The invention furthermore relates to a process for providing mixtures of halogenated, preferably brominated, aromatic, thermoplastic polycarbonates and ABS polymers with a flame-repellent finish, which is characterised in that the phthalimide of the formula (I) and the tetrafluoroethylene polymer are mixed with the thermoplastic polycarbonate and the ABS polymer via a twinscrew extruder and, if appropriate, the mixture is granulated. The flameproofing agents according to the invention can also be admixed here to one of the two components, that is to say the polycarbonate or the ABS polymer, beforehand.

The optimum processing conditions are such that a throughput of 24 kg/hour is achieved at a material temperature of 240° to 270° C., preferably 250° to 260° C., and a speed of rotation of 60 revolutions/minute.

The compounding unit used is preferably a twinscrew extruder from Werner und Pfleiderer with the designation ZSK 53.

The present invention furthermore also relates to thermoplastic moulding compositions based on mixtures of
(a) halogenated, preferably brominated, aromatic, thermoplastic polycarbonates and
(b) ABS polymers, characterised in that they contain
(c) bisphthalimides of the formula (I) in amounts of 0.5 to 2.5 parts by weight, preferably 1 to 2 parts by weight, based on 100 parts by weight of the sum of components (a) +(b), and in that they contain
(d) tetrafluoroethylene polymers in amounts of 0.05 to 1 part by weight, preferably 0.1–0.3 parts by weight, based on 100 parts by weight of the sum of components (a)+(b).

The ratio of components (a):(b) is between 15% by weight : 85% by weight and 80% by weight:20% by weight, preferably between 20% by weight : 80% by weight and 70% by weight : 30% by weight; the halogenated polycarbonate (a) contains from 3% by weight to 15% by weight of halogen, preferably bromine, based on the weight of the polycarbonate (a), which can be effected, for example, by cocondensation of tetrabromobisphenol A into the polycarbonate molecule. Halogenated, aromatic, thermoplastic polycarbonates in the context of the invention are thus polycarbonates with aromatically bonded halogen substituents.

Mixtures based on polycarbonates and ABS polymers which contain halogen-containing polycarbonates are known. See DE-OS (German Published Specification) No. 2,353,428, DE-OS (German Published Specification) No. 2,353,382 and DE-OS (German Published Specification) No. 2,353,383. Nothing is mentioned in these references of possible flame-repellency of such mixtures.

It is also known that thermoplastic resins of graft polymers based on methacrylates, copolymers based on aromatic vinyl monomers and aromatic polycarbonates can be rendered flame-repellent by the addition of carbonate oligomers of halogenated bisphenol A, it also being possible to add a synergist, for example antimony trioxide. (See DE-OS (German Published Specification) No. 2,264,104, in particular pages 9 and 10 and claim 2).

It is also known that ABS polymers can be provided with a flame-repellent finish with halogenated oligocarbonates with degrees of polymerisation of 2 to 10 and, if appropriate, additionally with inorganic or organic antimony compounds. (See DE-OS (German Published Specification) No.2,243,226).

Flame-repellent mixtures of ABS and high molecular weight aromatic, halogenated polycarbonates containing an antimony compound are also known (see DE-AS (German Published Specification) No. 2,446,327).

The abovementioned variants, which recommend antimony compounds as synergists, have the disadvantage that, in the case of special processing methods or moulding compositions which necessitate preparation at high temperatures because of their complicated composition, they lead to molecular weight degradation, to surface defects and to the development of waviness, that is to say they impair the processing stability. This is frequently accompanied by a deterioration in the mechanical properties of corresponding mixtures.

On the other hand, VO according to UL-Subj. 94 is not achieved at 3.2 mm without the addition of antimony.

It is known from DE-OS (German Published Specification) No. 1,946,924, that halogen-containing bisimides can be used as fire-retardant additives for ABS polymers, in general 5 to 40% by weightt preferably 20 to 30% by weight, of bisimide being used if this is added as the only fire-retardant compound (page 3, last-but-one paragraph of the DE-OS (German Published Specification)).

It is found, however, that small amounts of halogen-containing phthalimides up to 2.5% by weight do not give flame-repellent ABS with VO according to UL Subj. 94 at a thickness of 3.2 mm, even in combination with 1% by weight of tetrafluoroethylene polymers. (See Comparison Experiment 1).

DOS (German Published Specification) No. 2,737,913 likewise describes amounts of 1 to 25% by weight, preferably 9 to 15% by weight, of halogenated bisphthalimides based on an alkylenediamine as a flame-proofing component for rubber-modified polystyrenes. However, a metal synergist, such as antimony trioxide, is again probably required to achieve a V+O recipe.

It is also known that halogenated phthalimides can be added to thermoplastic polycarbonates as flameproofing agents (U.S. Pat. No. 3,873,567), if appropriate in combination with alkali metal salts or organic or inorganic acids and, if appropriate, polytetrafluoroethylenes (DE-OS (German Published Specification) No. 2,703,710, DE-OS (German Published Specification) No. 2,707,928 and DE-OS (German Published Specification) No. 2,740,850).- Flame-repellent polycarbonates with a content of alkali metal salts of inorganic acids, polytetrafluoroethylene and, if appropriate, aromatically bonded chlorine or bromine are further known from DE-OS (German Published Specification) No. 2,800,923. Finally, the combination of branched polycarbonates, halogenophthalimides, alkali metal salts and, in addition, organically bonded bromine, which has flame-repellency under extreme conditions, is also known. (DE-OS (German Published Specification) No. 3,203,905). In our opinion, no conclusion regarding effective flameproofing of mixtures of polycarbonates with ABS polymers without antimony compounds is possible from these teachings on providing polycarbonates with a flameproof finish.

Finally, flame-repellent thermoplastic polycarbonate blends containing 1. organic halogen compounds,
2. an alkali metal salt of an inorganic or organic acid and
3. a substance which reduces the tendency to drip, and which also contains a further thermoplastic, such as, for example, ABS, in amounts of 1.0 to 10% by weight, based on the total weight of the moulding composition, are also known (see DE-OS (German Published Specification) No. 2,918,883). Tetrahalogenophthalimide can also be effective as the organic halogen compound; polytetrafluoroethylenes may also be effective as the substance which reduces the tendency to drip.

However, it has been found that mixtures of halogen-free polycarbonates, 10% by weight of ABS, based on the total mixture, 5% by weight of halogenated phthalimide, based on the total mixture, and 3% by weight of polytetrafluoroethylene, based on the total mixture, do not have VO according to Subj 94 at a thickness of 3.2 mm (see Comparison Experiment 2). The presence of alkali metal salts is thus evidently indispensible.

From the DE-OS (German Published Specification) No. 2,903,100 flame-repellent mixtures comprising polycarbonates, ABS-polymers and halogen-containing compounds, are known. The flame-repellent property is achieved by the addition of special organic sulfonates. Fluorinated polyolefines can be added as antidripping agents.

It is also known, from DE-OS (German Published Specification) No. 2,937,877, that mixtures of polycarbonates with ABS can be rendered flame-repellent by the addition of halogenated phthalimides, it being necessary use 3 to 20% by weight, based on the total weight. However, the claim that VO is achieved at a thickness of 3.2 mm is not documented by examples; rather, in the examples this is only achieved by simultaneous addition of $Sb_2O_3$ (see Examples 1 and 2 of DE-OS (German Published Specification) No. 2,937,877).

It has now been found that mixtures of halogenated polycarbonate and ABS in the mixtures according to the present invention still do not have VO according to UL-Subj. 94 at a thickness of 3.2 mm with the sole addition of a halogenated phthalimide from DE-OS (German Published Specification) No. 2,937,877 in amounts of 5 parts by weight (see Comparison Experiment 3).

It has also been found that the phthalimides of the formula (I) which can be used according to the invention do not give a certain VO according to UL-Subj. 94 at a thickness of 3.2 mm without the addition of tetrafluoroethylene polymers in the mixtures according to the invention of halogenated polycarbonate and ABS in amounts of up to 2.5% by weight, based on the total weight of polycarbonate, ABS and phthalimide of the formula (I) (see Comparison Experiment 4).

It was therefore not to be expected that the combined use of a phthalimide of the formula (I) with tetrafluoroethylene polymers, both in small amounts, effects an improvement in the flame-repellency of polycarbonate ABS mixtures, since this success is achieved without metal-containing synergists.

Aromatically halogenated, preferably brominated, aromatic thermoplastic polycarbonates which can be used according to the invention are the known copolycarbonates of halogenated diphenols and halogen-free diphenols, the molar amounts of cocondensed halogenated diphenols being chosen such that the copolycarbonates contain 3% by weight to 15% by weight of halogen, preferably bromine, based on the weight of polycarbonate resin. Preferred amounts of halogen are 5 to 10% by weight, again based on the weight of polycarbonate resin.

Particularly suitable halogenated diphenols are 2,2-bis-(4-hydroxy-3,5-dibromophenyl)-propane and 2,2-bis-(4-hydroxy-3,5-dichlorophenyl)-propane. 2,2-Bis-(4-hydroxy-3,5-dibromophenyl)-propane is particularly preferred.

Suitable cocondensable diphenols are hydroquinone, resorcinol, dihydroxydiphenyls, bis-(hydroxyphenyl)alkanes, bis-(hydroxyphenyl)-cycloalkanes, bis-(hydroxyphenyl) sulphides, bis-(hydroxyphenyl) ethers, bis(hydroxyphenyl) ketones, bis-(hydroxyphenyl) sulphoxides, bis-(hydroxyphenyl) sulphones and $\alpha,\alpha'$-bis/hydroxyphenyl)diisopropylbenzenes, it also being possible for the phenyl radicals to carry alkyl substituents.

These and other suitable diphenols are described, for example, in U.S. Pat. Nos. 3,028,365, 2,999,835 and 2,999,846, in German Offenlegungsschriften (German Published Specifications) Nos. 1,570,703, 2,063,050, 2,063,052, 2,211,956 and 2,211,957, French Patent Specification No. 1,561,518 and the monograph "H. Schnell, Chemistry and Physics of Polycarbonates, Interscience Publishers, New York, 1964".

Preferred cocondensable diphenols are: 4,4'-dihydroxydiphenyl, 2,2-bis-(4-hydroxyphenol)-propane, 2,4-bis-(4-hydroxyphenol)-2-methylbutane, 1,1-bis-(4-hydroxy-phenol)-cyclohexane, $\alpha,\alpha'$-bis-(4-hydroxyphenyl)-p-diisopropylbenzene, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane and $\alpha,\alpha'$-bis-(3,5-dimethyl-4-hydroxyphenyl)-p-diisopropylbenzene.

Particularly preferred cocondensable diphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

Examples of halogenated polycarbonates which can be used according to the invention are those of 5-25 parts by weight of tetrabromobisphenol A and 95 to 75 parts by weight of one or more of the abovementioned diphenols, in particular those of tetrabromobisphenol A and 2,2-bis-(4-hydroxyphenyl)-propane (bisphenol A).

Halogenated polycarbonates which are preferred according to the invention are the copolycarbonates of brominated diphenols mentioned with the cocondensable diphenols mentioned as preferred. Corresponding statements apply to the particularly preferred copolycarbonates which can be used according to the invention.

The copolycarbonates which can be used according to the invention are prepared in a known manner in accordance with the literature references mentioned above for the diphenols. The three known processes, that is to say the phase boundary process, the process in a homogeneous phase and that of melt esterification, are thus suitable.

The aromatic polycarbonates can be branched by incorporation of small amounts, preferably of amounts between 0.05 and 2.0 mol % (based on the diphenols employed), of compounds which are trifunctional or more than trifunctional, for example those with three or more than three phenolic hydroxyl groups.

The aromatic polycarbonates should as a rule have average weight-average molecular weights $M_w$ of 10,000 to 200,000, preferably of 20,000 to 80,000 (determined by measurement of the relative viscosity in $CH_2Cl_2$ at 25° C. at a concentration of 0.5 g in 100 ml).

ABS polymers which can be used according to the invention are mixtures of (b.1) 25-100 parts by weight of a graft polymer of ethylenically unsaturated monomers on rubbers of the series of diene monomer and EPDM rubbers and (b. 2) 0-75 parts by weight of a rubber-free vinyl monomer polymer.

Graft polymers (b.1) in the context of the invention are those in which a monomer mixture of 95-50% by weight of styrene, $\alpha$-methylstyrene or mixtures thereof and 5-50% by weight of acrylonitrile, methacrylonitrile or mixtures thereof is polymerised, by grafting, onto a rubber.

Particularly suitable rubbers are polybutadiene, butadiene/styrene copolymers with up to 30% by weight of copolymerised styrene or copolymers of butadiene and acrylonitrile with up to 20% by weight of acrylonitrile. Further suitable rubbers are, for example, polyisoprene or polychloroprene. Examples of other suitable rubbers are EPDM rubber, that is to say rubber obtained from ethylene, propylene and a non-conjugated diene monomer. Diene monomer rubbers are particularly preferred.

The graft copolymers (b.1) contain 5-80% by weight, in particular 20-70% by weight, of rubber and 95-20% by weight, in particular 80-30% by weight, of monomers copolymerised by grafting. The rubbers in these graft copolymers are in the form of at least partially crosslinked particles of average particle size 0.08-5 $\mu$m, in particular 0.1-1 $\mu$m. Such graft copolymers are prepared by free radical grafting copolymerisation of monomers from the series of styrene, $\alpha$-methylstyrene, acrylonitrile and methacrylonitrile in the presence of the rubbers to be grafted and are all known. Preferred preparation processes for such graft copolymers are emulsion, solution, bulk or suspension polymerisation.

The rubber-free vinyl monomer polymers (b.2) can be built up from the grafted monomers or similar monomers, in particular from at least one monomer from the series of styrene, $\alpha$-methylstyrene, halogenostyrene, acrylonitrile, methacrylonitrile, maleic anhydride and vinyl acetate. They are preferably copolymers of 95-50% by weight of styrene, $\alpha$-methylstyrene or mixtures thereof with 5-50% by weight of acrylonitrile, methacrylonitrile or mixtures thereof. Such copolymers are frequently formed as by-products in grafting copolymerisation, especially if large amounts of monomer are to be grafted onto small amounts of rubber. It is thus possible for copolymers of this type which have been prepared separately also to be mixed in beside or instead of the copolymers thus formed.

Copolymers prepared separately in this manner are resinous, thermoplastic and rubber-free; they are, in particular, copolymers of styrene and/or α-methylstyrene with acrylonitrile. Particularly preferred copolymers consist of 20–40% by weight of acrylonitrile and 60–60% by weight of styrene or α-methylstyrene. Such copolymer compositions are known and can be prepared, in particular, by free radical polymerisation processes, especially by emulsion, suspension, solution or bulk polymerisation.

The copolymers preferably have molecular weights of 15,000 to $2 \times 10^5$.

Examples of suitable bisphthalimides of the formula (I) are tetrachlorophthalimides or phthalimides based on o-, m- or p-xylylenediamine, in particular tetrachlorophthalimide or phthalimide based on m-xylylenediamine; examples of suitable tetrafluoroethylene polymers are those such as are obtainable under the name Hostaflon(R) from Hoechst.

The bisphthalimides mentioned can be prepared in accordance with the literature references mentioned above or by the process described in the preparation example.

The flameproofing agent combination is prepared either by direct mixing of the individual components or as a concentrate by preparation of concentrates of the individual components in one of the thermoplastic constituents of the mixture and subsequent mixing of these concentrates.

The flameproofing agent combination can be incorporated into the thermoplastic moulding composition of halogenated polycarbonate and ABS polymer by mixing all the individual components or by selective mixing of the components with the thermoplastic polycarbonate.

In a preferred preparation method, a latex of a graft copolymer (b.1) is first precipitated and dried. The powder thus obtained is then mixed with the polycarbonate and the flameproofing agent combination, and separately prepared copolymer (b.2). Roll mills, screw extruders or internal mixers, for example, are suitable for this, incorporation temperatures of 240° to 270° C. being required.

The flame-repellent moulding compositions according to the invention, based on polycarbonates and ABS polymers can additionally contain the additives known for polycarbonates and/or ABS polymers, such as stabilisers, pigments, flow control agents, lubricants, mould release agents and antistatics, these being either added to the polycarbonate and/or the ABS polymer beforehand or admixed during mixing of the individual components of the moulding composition according to the invention.

The moulding compositions of the present invention can be used for the production of all types of shaped articles. In particular, shaped articles can be produced by injection moulding. Examples of shaped articles which can be produced are: all types of housing components (for example for household appliances, such as juice extractors, coffee machines and mixers) or covering sheets for the building sector and components for the automobile sector. They are also used in the field of electrical technology, because they are distinguished by very good electrical properties.

The moulding compositions in the following examples were prepared on an internal kneader at about 240° C. or in a twin-screw extruder at about 260° C., by mixing the individual components.

The fire behaviour of the samples was measured according to UL-Subj. 94 V in test piece thicknesses of 3.2 mm. The UL 94 test is carried out as follows:

Samples of the substance are shaped to bars having the dimensions $127 \times 12.7 \times 3.2$ mm. The bars are mounted vertically so that the underside of the test piece is 305 mm above a strip of cotton wool material. Each test bar is ignited individually by means of two successive ignition operations lasting 10 seconds, the burning characteristics are observed after each ignition operation and the sample is then evaluated. A Bunsen burner with a blue flame 10 mm (3/8 inch) high of natural gas with a heat content of $3.73 \times 10^4$ kJ/m$^3$ (1.000 BTU per cubic foot) is used to ignite the sample.

The UL 94-V-O classification relates to the properties, described below, of materials which have been tested in accordance with the UL 94 specification. The polycarbonates in this class contain no samples which burn for longer than 10 seconds after each action of the test flame; they show no overall flaming time of more than 50 seconds when the flame is allowed to act twice on each set of samples, and they contain no samples which burn completely up to the holding clamp attached at the top end of the sample; they contain no samples which ignite the cotton wool placed below the samples from burning drops or particles; they also contain no samples which glow for longer than 30 seconds after removal of the test flame.

Other UL 94 classifications designate samples which are less flame-repellent and self-extinguishing and which produce flaming drops or particles. These classifications are desinated UL 94 V-1 and V-2. F. means "failed" and is the classification of samples which have an afterburn time of greater than 30 seconds.

EXAMPLES

I. Components (a) Copolycarbonate

A copolycarbonate consisting of 90% by weight of bisphenol A and 10% by weight of tetrabromobisphenol A with a relative solution viscosity of 1.284, measured in CH$_2$Cl$_2$ at 25° C. and at a concentration of 0.5% by weight. Content of bromine: 5% by weight.

(b) ABS polymer of (b.1) Graft polymer (60 parts by weight):

60 parts by weight of a graft polymer prepared by grafting 35 parts by weight of styrene and 15 parts by weight of acrylonitrile onto 50 parts by weight of a coarse-particled polybutadiene (in accordance with the statements in DE-AS (German Published Specification) Nos. 1,247,665 and 1,269,360, prepared by emulsion polymerisation), the average particle diameter of the polybutadiene graft base, which is in latex form, being between 0.3 and 0.4 μm (these particle size data and corresponding data in the text represent average particle diameters (d$_{50}$) and are determined by ultracentrifuge measurement; in this context, see: W. Scholtan et al. Colloids Z. Polymere, 250 (1972), pages 783–796), and b.2) Copolymer (40 parts by weight):

40 parts by weight of a styrene/acrylonitrile copolymer, with a styrene/acrylonitrile ratio of 70:30 and a limiting viscosity of [η]=0.55 dl/g (measurement in dimethylformamide at 20° C.).

(c) Preparation of a bisphthalimide of the formula (I) which can be used according to the invention The preparation of the bisphthalimide based on m-xylylenediamine is described by way of example for all the other compounds. Other bisphthalimides can be obtained analogously in each case by varying the phthalic 5 anhydride or the diamine.

3 moles (444 g) of phthalic anhydride were heated to 100° C. together with 22.2 g of glacial acetic acid (5% by weight, based on the anhydride employed) in 1,776 g of toluene. A solution of 1.5 moles (204 g) of m-xylylenediamine in 612 g of methanol is added dropwise to this suspension in the course of 1 hour, methanol simultaneously being distilled off. The mixture is concentrated to 1 liter of residual solution, the solution is then cooled and the precipitate is filtered off with suction. This was suspended 3 times in about 3 liters of distilled water and rinsed with water until neutral and with methanol. The resulting material was dried at 80° C. under a waterpump vacuum.

Yield: 555 g.

| Elemental analysis: | C | H | O | N |
|---|---|---|---|---|
| theoretical: | 72.7 | 4.0 | 16.2 | 7.1 |
| found: | 72.3 | 4.03 | 16.5 | 7.06 |

(d) The tetrafluoroethylene polymer used is a product of Hoechst called Hostaflon ®

II. Use examples (including comparison experiments)

In each case mixtures of 70 parts by weight of the copolycarbonate (a) and 30 parts by weight of the ABS polymer (b) were prepared and granulated at 250° C. with the aid of a twin-screw extruder, the tetrafluoroethylene polymer (d), where relevant, and also, where relevant, the bisphthalimide (c) being incorporated. The granules were injection-moulded to test pieces having the dimensions 127 mm × 12.2 mm × 3.2 mm and were examined for their fire repellency according to UL-94-V.

| | | Examples: | | |
|---|---|---|---|---|
| PC (a) parts by weight | ABS (b) parts by weight | PTFE (d) parts by weight | BPI (c) parts by weight | UL-94 V (3.2 mm) |
| 70 | 30 | — | — | f |
| 70 | 30 | 0.15 | — | f |
| 70 | 30 | 0.15 | 2.0 | V-0 | f = failed, that is to say neither V0, nor V1, nor V2.
BPI = bisphthalimide based on m-xylylenediamine according to Example (c).

III. Comparison Experiments 1 to 4 on the prior art

Comparison Experiment I

An ABS polymer (b) was mixed and granulated with the halogenated bisphthalimides mentioned below and, where relevant, with a tetrafluoroethylene polymer (d) via a twin-screw extruder. The mixtures were injection-moulded to test pieces having the dimensions 127 mm × 12.2 mm × 3.2 mm and were examined for their fire repellency according to UL-94-V.

| Bisphthalimide parts by weight | PTFE (d) parts by weight | ABS (b) | ULV-94 V 3.2 mm |
|---|---|---|---|
| m-Xylylene-bis-tetrachlorophthalimide (c) | | | |
| 2.5 | | 97.5 | f |
| 2.5 | 1.0 | 96.5 | f |
| Ethylene-bis-tetrabromorphthalimide | | | |
| 2.5 | 1.0 | 96.5 | f |

Comparison Experiment 2

82 parts by weight of a halogen-free polycarbonate (base: bisphenol A; relative solution viscosity of 1.28, measured as a 0.5% strength solution in methylene chloride and at 25° C.), 10 parts by weight of ABS polymer (b), 5 parts by weight of hexamethylene-bistetrachlorophthalimide and 3 parts by weight of PTFE polymer (d) were mixed and granulated at about 270° C. via a twin-screw extruder. This mixture was injection-moulded to test pieces having the dimensions 127 mm × 12.2 mm × 3.2 mm and was examined for its fine repellency according to UL-94 V. Result: UL-94 V at 3.2 mm: V 1.

Comparison Experiment 3

70 parts by weight of the copolycarbonate (a), 30 parts by weight of ABS polymer (b) and 5 parts by weight of ethylene-bistetrabromophthalimide (FR additive according to DE-OS (German Published Specification) No. 2,937,877) were mixed and granulated at about 250° C. via a twin-screw extruder. This mixture was injection-moulded to test pieces having the dimensions 127 mm × 12.2 mm × 3.2 mm and was examined for its fire repellency according to UL-94 V. Result: UL-94 V at 3.2 mm: V-2.

Comparison Experiment 4

70 parts by weight of the copolycarbonate (a), 30 parts by weight of the ABS polymer (b) and 2 parts by weight of the bisphthalimide (c) (m-xylylene-bisphthalimide) were mixed and granulated at about 250° C. via a twin-screw extruder. This mixture was injection-moulded to test pieces having the dimensions 127 mm × 12.2 mm × 3.2 mm and was examined for its fire repellency according to UL-94 V. Both V0 and V2 were obtained as the result.

CIP-Disclosure (Correction)

The copolycarbonate (a) from page 14 and used in the preceding Examples and Experiments is a copolycarbonate of bisphenol A and 10% by weight, relative to the total weight of the copolycarbonate, of tetrabromobisphenol-A with a relative solution viscosity of 1,284 measured in $CH_2Cl_2$ at 25° C. and at a concentration of 0.5% by weight. Content of bromine: 5% by weight.

CIP Disclosure

The compounds of the chemical formula (I) of page 1 correspond to those of formula (Ia)

based on o-, m- or p-xylylenediamine of the formulae (Ia, 1,2,3)

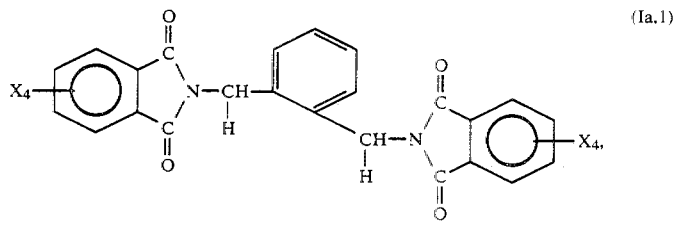
(Ia,1)

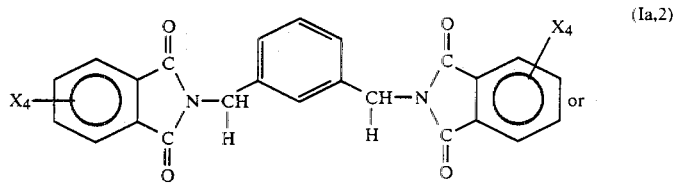
(Ia,2) or

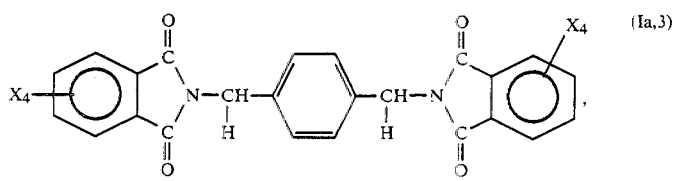
(Ia,3)

wherein x denotes either hydrogen or chlorine.

In particular the bistetrachlorophthalimide or bisphthalimide based on m-xylylene diamine is suitable which corresponds to formula (Ia,2).

We claim:

1. Flameproof agent combination consisting of
   (a) 0.5 to 2.5 parts by weight of a bisphthalimide of the formula (Ia)

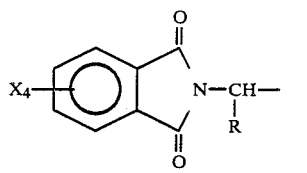
(Ia)

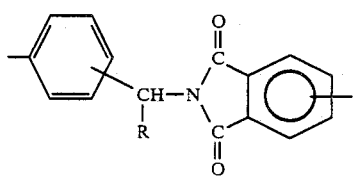

or of the formula (Ib)

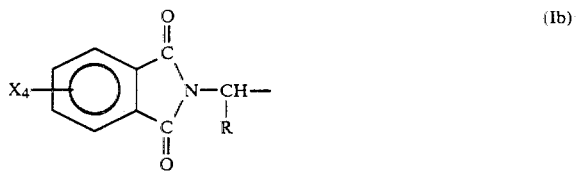
(Ib)

wherein X denotes H or halogen, such as, for example, chlorine or bromine, and R denotes a $C_1$–$C_4$-alkyl, a $C_5$–$C_6$-cycloalkyl, or an optionally substituted $C_6$–$C_{30}$-aryl; moreover, R in formulae (Ia) and (Ib) shall have also the meaning of hydrogen.

Examples of suitable bisphthalimides of the formula (I) are bis-tetrachlorophthalimides or bis-phthalimides

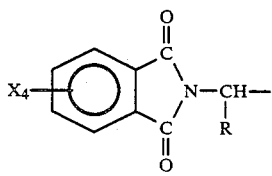
of of formula (Ib)

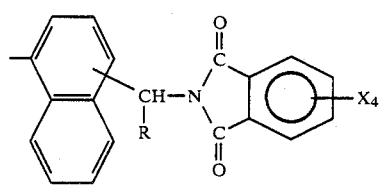
(Ib)

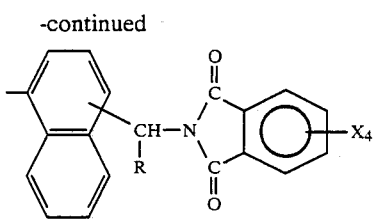

wherein
X denotes hydrogen or halogen and
R denotes hydrogen, a $C_1$–$C_4$-alkyl, a $C_5$–$C_6$-cycloalkyl or an optionally substituted $C_6$–$C_{30}$-aryl group, and
(b) 0.05 to 1 part by weight of a tetrafluoroethylene polymer.

2. Flameproofing agent combination consisting of
(a) 0.5 to 2.5 parts by weight of a bistetrachlorophthalimide or a bisphthalimide based on o-, m- or p-xylylenediamine of the formulae (Ia,1,2,3)

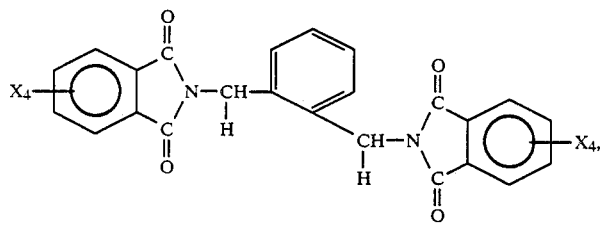

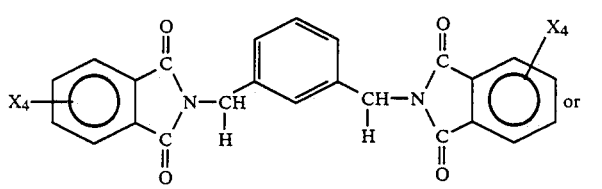

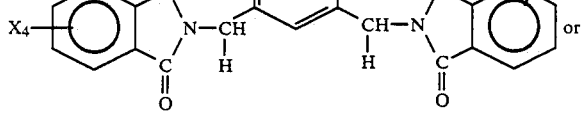

wherein X denotes either hydrogen or chlorine, and
(b) 0.05 to 1 part by weight of a tetrafluoroethylene polymer.

3. A flameproofing agent combination according to claim 2, in which the bistetrachlorophthalimide or bisphthalimide is based on m-xylylene diamine and corresponds to formula (Ia,2).

4. A flameproofing agent combination according to claim 1, in which the tetrafluroethylene polymer has a weight average molecular weight $\overline{M}w$ of between $10^5$ and $10^6$.

5. A flameproofing agent combination according to claim 2 in which the tetrafluoroethylene polymer has a weight averaqe molecular weight $\overline{M}w$ of between $10^5$ and $10^6$.

6. A process for providing a mixture of halogenated, aromatic polycarbonate and ABS polymer with a flame-repellent finish comprising incorporating therein a flameproofing agent combination according to claim 1.

7. A process for providing a mixture of halogenated, aromatic polycarbonate and ABS polymer wilh a flame-repellent finish. comprising incorporating therein a flameproofing agent combination according to claim 2.

8. A process according to claim 6, in which the bisphthalimide of claim 1 of formula (Ia) or (Ib) and the tetrafluoroethylene polymer are admixed to the thermoplastic polycarbonate and lhe ABS polymer via a twin-screw extruder at a material temperature of 240° to 270° C., a speed of rotation of substantially 60 revolutions/minute and a throughput of substantially 24 kg/hour.

9. A process according to claim 7, in which the bisphthalimide of claim 3 of formula (Ia,1), (Ia,2) or (Ia,3) and the tetrafluoroethylene polymer are admixed to the thermoplastic polycoarbonate and the ABS polymer via a twin-screw extruder at a material temperature of 240° to 270° C., a speed of rotation of substantially 60 revolutions/minute and a throughput of substantially 24 kg/hour.

10. A process according to claim 6 in which the polycarbonate is a brominated polycarbonate.

11. A process according to claim 7 in which the polycarbonate is a brominated polycarbonate.

12. A thermoplastic moulding composition based on a mixture of
(a) halogenated, aromatic, thermoplastic polycarbonate and
(b) ABS polymer, said mixture having a content of
(c) bisphthalimide as defined in claim 1, in an amount of 0.5 to 2.5 parts by weight, based on 100 parts by weight of the sum of components (a)+(b), and a content of (d) tetrafluoroethylene polymer in an amount of 0.05 to 1 part by weight, based on 100 parts by weight of the sum of components (a)+(b), the weight ratio of components (a):(b) being between 15% by weight:85% by weight and 80% by weight:20% by weight, and the halogenated polycarbonate (a) containing 3% by weight to 15% by weight of halogen, based on the weight of the polycarbonate (a).

13. A thermoplastic moulding composition based on a mixture of (a) halogenated, aromatic, thermoplastic polycarbonate and
(b) ABS polymer, said mixture having a content of
(c) bisphthalimide as defined in claim 2, in an amount of 0.5 to 2.5 parts by weight, based on 100 parts by weight of the sum of components (a) +(b), and a content of (d) tetrafluoroethylene polymer in an amount of 0.05 to 1 part by weight, based on 100 parts by weight of the sum of components (a)+(b), the weight ratio of components (a):(b) being between 15% by weight: 85% by weight and 80% by weight: 20% by weight, and the halogenated polycarbonate (a) containing 3% by weight to 15% by weight of halogen, based on the weight of the polycarbonate (a).

14. A thermoplastic moulding composition based on a mixture of
(a) halogenated, aromatic, thermoplastic polycarbonate and
(b) ABS polymer, said mixture having a content of (c) bisphthalimide as defined in claim 3 in an amount of 0.5 to 2.5 parts by weight, based on 100 parts by weight of the sum of components (a)+(b), and a content of (d) tetrafluoroethylene polymer in an amount of 0.05 to 1 part by weight, based on 100 parts by weight of the sum of components (a)+(b), the weight ratio of components (a):(b) being between 15% by weight:85% by weight and 80% by weight:20% by weight, and the halogenated polycarbonate (a) containing 3% by weight to 15% by weight of halogen, based on the weight of the polycarbonate (a).

15. A moulding composition according to claim 12, in which the polycarbonate is a brominated polycarbonate.

16. A moulding composition according to claim 13, in which the polycarbonate is a brominated polycarbonate.

17. A moulding composition according to claim 14 in which the polycarbonate is a brominated polycarbonate.

18. A moulding composition according to claim 15, in which the polycarbonate is a polycarbonate of 5 to 25 parts by weight of tetrabromobisphenol A and 95 to 75 parts by weight of 2,2-bis-(4-hydroxyphenyl)-propane (bisphenol A).

19. A moulding composition according to claim 16, in which the polycarbonate is a polycarbonate of 5 to 25 parts by weight of tetrabromobisphenol A and 95 to 75 parts by weight of 2,2-bis-(4-hydroxyphenyl)-propane (bisphenol A).

20. A moulding composition according to claim 17, in which the polycarbonate is a polycarbonate of 5 to 25 parts by weight of tetrabromobisphenol A and 95 to 75 parts by weight of 2,2-bis-(4-hydroxyphenyl)-propane (bisphenol A).

21. A moulding composition according to claim 12 containing 1 to 2 parts by weight, based on 100 parts by weight of components (a)+(b), of component (c) and 0.1 to 0.3 parts by weight, based on 100 parts by weight of components (a)+(b), of component (d) in which the weight ratio of components (a):(b) is between 20% by weight:80% by weight and 70% by weight:30% by weight.

22. A moulding composition according to claim 13 containing 1 to 2 parts by weight, based on 100 parts by weight of components (a)+(b), of component (c) and 0.1 to 0.3 parts by weight, based on 100 parts by weight of components (a)+(b), of component (d) in which the weight ratio of components (a):(b) is between 20% by weight:80% by weight and 70% by weight:30% by weight.

23. A moulding composition according to claim 14 containing 1 to 2 parts by weight, based on 100 parts by weight of components (a)+(b), of component (c) and 0.1 to 0.3 parts by weight, based on 100 parts by weight of components (a)+(b), of component (d) in which the weight ratio of components (a):(b) is between 20% by weight:80% by weight and 70% by weight:30% by weight.

24. A process according to claim 8 in which the polycarbonate is a brominated polycarbonate.

25. A process according to claim 9 in which the polycarbonate is a brominated polycarbonate.

26. Flameproofing agent combination according to claim 1 wherein for formula (Ia) or (Ib), R is a $C_1$–$C_4$ -alkyl, a $C_5$–$C_6$ -cycloalkyl, a $C_6$–$C_{30}$ -aryl or a substituted $C_6$–$C_{30}$ -aryl.

27. A flameproofing agent combination according to claim 26, in which the tetrafluoroethylene polymer has a weight average molecular weight $\overline{M}w$ of between $10^5$ and $10^6$.

28. A process for providing a mixture of halogenated, aromatic polycarbonate and ABS polymer with a flame-repellent finish comprising incorporating therein a flameproofing agent combination according to claim 26.

29. A process according to claim 28 in which the bisphthalimide of claim 2 of formula (Ia) or (Ib) and the tetrafluoroethylene polymer are admixed to the thermoplastic polycarbonate and the ABS polymer via a twin-screw extruder at a material temperature of 240° to 270° C., a speed of rotation of substantially 60 revolutions/minute and a throughput of substantially 24 kg/hour.

30. A process according to claim 28 in which the polycarbonate is a brominated polycarbonate.

31. A thermoplastic moulding composition based on a mixture of
(a) halogenated, aromatic, thermoplastic polycarbonate and
(b) ABS polymer, said mixture having a content of
(c) bisphthaliamide as defined in claim 26, in an amount of 0.5 to 2.5 parts by weight, based on 100 parts by weight of the sum of components (a)+(b), and a content of (d) tetrafluoroethylene polymer in an amount of 0.05 to 1 part by weight, based on 100 parts by weight of the sum of components (a)+(b), the weight ratio of components (a):(b) being between 15% by weight:85% by weight and 80% by weight:20% by weight, and the halogenated polycarbonate (a) containing 3% by weight to 15% by weight of halogen, based on the weight of the polycarbonate (a).

32. A moulding composition according to claim 31, in which the polycarbonate is a brominated polycarbonate.

33. A moulding composition according to claim 32, in which the polycarbonate is a polycarbonate of 5 to 25 parts by weight of tetrabromobisphenol A and 95 to 75 parts by weight of 2,2-bis-(4-hydroxyphenyl)-propane (bisphenol A).

34. A moulding composition according to claim 31 containing 1 to 2 parts by weight, based on 100 parts by weight of components (a)+(b), of component (c) and 0.1 to 0.3 parts by weight, based on 100 parts by weight of components (a)+(b), of component (d) in which the weight ratio of components (a):(b) is between 20% by weight:80% by weight and 70% by weight:30% by weight.

35. A process according to claim 29 in which the polycarbonate is a brominated polycarbonate.

* * * * *

UNITED STATES PATENT AND TRADEMARK OFFICE
CERTIFICATE OF CORRECTION

PATENT NO. : 4,786,671

DATED : November 22, 1988

INVENTOR(S) : Hans-Jurgen Kress et al

It is certified that error appears in the above-identified patent and that said Letters Patent is hereby corrected as shown below:

On the front page in Item [75] the spelling of the last-named inventor's last name should be -- Buekers --.

Signed and Sealed this

Twenty-first Day of November, 1989

Attest:

JEFFREY M. SAMUELS

Attesting Officer    Acting Commissioner of Patents and Trademarks